United States Patent
Sergan

[15] 3,683,686
[45] Aug. 15, 1972

[54] MECHANICAL TORQUE WRENCH AND A HYDRAULIC READOUT THEREFOR

[72] Inventor: Anthony J. Sergan, Glastonbury, Conn.

[73] Assignee: Raymond Engineering, Inc., Middletown, Conn.

[22] Filed: April 27, 1970

[21] Appl. No.: 32,234

[52] U.S. Cl. ................................................73/139
[51] Int. Cl. .................................................G01l 5/24
[58] Field of Search.........73/1 C, 136 D, 136 R, 139; 81/56, 57

[56] References Cited

UNITED STATES PATENTS

| | | | |
|---|---|---|---|
| 2,019,755 | 11/1935 | Zerbe et al. | 73/136 R |
| 1,437,017 | 11/1922 | Roberts | 73/139 |
| 2,216,563 | 10/1940 | Cartier | 73/139 X |
| 2,300,288 | 10/1942 | Hullhorst | 73/136 R |
| 2,518,708 | 8/1950 | Moore | 73/136 R X |
| 2,550,693 | 5/1951 | Hart | 73/136 R |
| 3,472,083 | 10/1969 | Schnepel | 81/57 X |

Primary Examiner—Charles A. Ruehl
Attorney—Mattern, Ware and Davis

[57] ABSTRACT

The output member of a torque wrench is "free-floating" with respect to the mounting member and therefore capable of epicycloidal oscillation, with respect to the mounting member, in response to forces generated by system misalignment or offset. This results in the reduction of side loading on the system to be torqued, less tendency to bind, and the production of accurate torque force readings. The torque measuring system comprises two hydraulic load-cells and a Bourdon gauge interconnected by hydraulic tubing, hermetically sealed and filled with a non-compressible fluid. The load-cells are loosely mounted symmetrically in opposite ends of the mounting member and are each compressible in either torque direction by loading pins mounted on the wrench case. The readout is thus hysteresis free. The use of two interconnected load-cells provides force compensation and thereby assures that an accurate reading is transmitted to the gauge. Furthermore, this force balance and the sliding motion permitted transverse to the load-cells' axes facilitate the above-described "free-floating" feature.

11 Claims, 7 Drawing Figures

INVENTOR
ANTHONY J. SERGAN

BY
MATTERN WARE AND DAVIS
ATTORNEYS 3,683,686

MECHANICAL TORQUE WRENCH AND A HYDRAULIC READOUT THEREFOR

SUMMARY OF THE INVENTION

This invention relates to torque wrenches and a hydraulic readout therefor.

While many torque wrenches exist in the art, they are each subject to one or more of the following disadvantages:

A primary drawback in the existing torque wrenches is the inability to create a completely portable, maneuverable, mechanical torque wrench that is capable of delivering high torque force outputs. Presently, high torque forces are not obtainable or else a hydraulic source is required.

Another difficulty presently existing in mechanical torque measuring wrenches is the inability to accurately measure both clockwise and counterclockwise torquing on a single gauge. The present systems require at least two gauges, one for each direction, and as a result are large and cumbersome.

A further problem with the existing torque measuring wrenches is their inability to obtain an accurate reading of the torquing output. Existing systems function acceptably only when all of the apparatus is precisely aligned. If, however, there are any side loadings resulting from a slight offset between the torque wrench and the item to be torqued, the prior art torque measuring wrenches are not able to compensate for the force variations and produce inaccurate readings. Furthermore, the gauges generally used mechanically measure a deflection and, consequently, are subject to hysteresis effects.

A primary object of this invention is to provide a torque wrench that is completely portable, easy to handle, and capable of delivering high torque force outputs with a minimum input torque force.

Another object of this invention is to provide a torque measuring system that is capable of measuring on a single gauge both clockwise and counterclockwise torquing forces.

A further object of this invention is to provide a torque measuring system of the above character that minimizes hysteresis effects.

Another object of this invention is to provide a torque measuring system of the above character that is sensitive as well as accurate.

Another object of this invention is to provide a torque wrench of the above character having a torque measuring system of the above character that can accurately indicate the torque being applied even when there is substantial misalignment.

Still another object of this invention is to provide a torque wrench of the above character that is essentially "free-floating"d in its response to reaction torque and capable of reducing side loadings and producing an accurate reading of the applied torque.

A further object of this invention is to provide a torque wrench of the above character that is not only accurate, but also capable of withstanding substantial manual abuse.

Other objects of the invention will in part be obvious and will in part appear hereinafter.

The torque wrench, according to this invention, is designed to be completely portable, easily handled, and capable of delivering an output torque that is 100 times greater than the input torque. With the use of this wrench, repairs that require high torque forces can be efficiently accomplished in the field without the use of complicated pneumatic equipment. An output torque of 2,500 foot pounds can be generated by an input torque of merely 25 foot pounds.

A further advantage of this torque wrench is its ability to provide accurate readings on a single gauge for torque forces which are applied in either the clockwise or the counterclockwise direction and, more important, its ability to automatically compensate for the added forces created by system offset or misalignment. This capability is achieved by constructing the torque wrench so that two hydraulic bellows load-cells are individually securely positioned between two holding posts, which are connected to or form part of the torque wrench case, which contains the torque multiplying and transmitting gears. Furthermore, the two bellows are loosely contained within annular spaces formed in a mounting member. The mounting member is connected to the torque wrench case in such a manner that allows the torque wrench case to freely move in a single plane. The resulting effect of this torque wrench design is a torque wrench case that is responsive to reaction torque forces while being able to freely float, in a single plane, about the fixed mounting member. This added degree of freedom allows the torque wrench to adjust to the forces generated by system offset or misalignment, and results in a reduction of side loading forces on the system to be torqued and the production of an accurate balanced measurement of the torque applied.

The two bellows are interconnected by means of hydraulic tubing with one gauge. The system is hermetically sealed and contains a hydraulic fluid. Compression of the bellows causes the hydraulic fluid contained within the system to transmit the force applied equally throughout the system, thereby causing it to be registered on the gauge. The gauge that is employed uses a Bourdon tube and consequently is very sensitive to the pressure changes of the hydraulic fluid and accurately measures these changes. Other advantages of this type of gauge are the elimination of moving parts mechanically engaged, which consequently eliminates the hysteresis problem that exists with the other type gauges, and the ability to sustain a greater degree of vibration shock without mechanical failure.

The use of two properly positioned bellows interconnected with a single gauge and hermetically sealed containing a hydraulic fluid provides an extremely accurate and mechanically simple torque measuring system that is capable of measuring both clockwise and counterclockwise torque on a single gauge.

Prior art systems are not capable of compensating for the unbalanced forces that are produced when adapters from the torque wrench to the item to be torqued are not perfectly coaxial, and as a result the torque measuring gauge will indicate the unbalanced force. Since this reading is false, an accurate reading of the torque applied to the unit is not obtained.

By using the torque wrench according to this invention, the free-floating torque wrench case automatically balances the forces and eliminates the unbalancing side loading force. Since the balanced forces are the actual torque applied to the unit, the gauge, which in this system is interconnected with the two bellows, will measure only the magnitude of these balanced forces and, consequently, will accurately indicate the actual torque applied.

The invention accordingly comprises the features of construction, combinations of elements, and arrangement of parts which will be exemplified in the constructions hereinafter set forth, and the scope of the invention will be indicated in the claims.

THE DRAWINGS

For a fuller understanding of the nature and objects of the invention, reference should be had to the following detailed description taken in connection with the accompanying drawings, in which.

The same reference characters refer to the same elements throughout the several views of the drawings.

SPECIFIC DESCRIPTION

Figure 1:
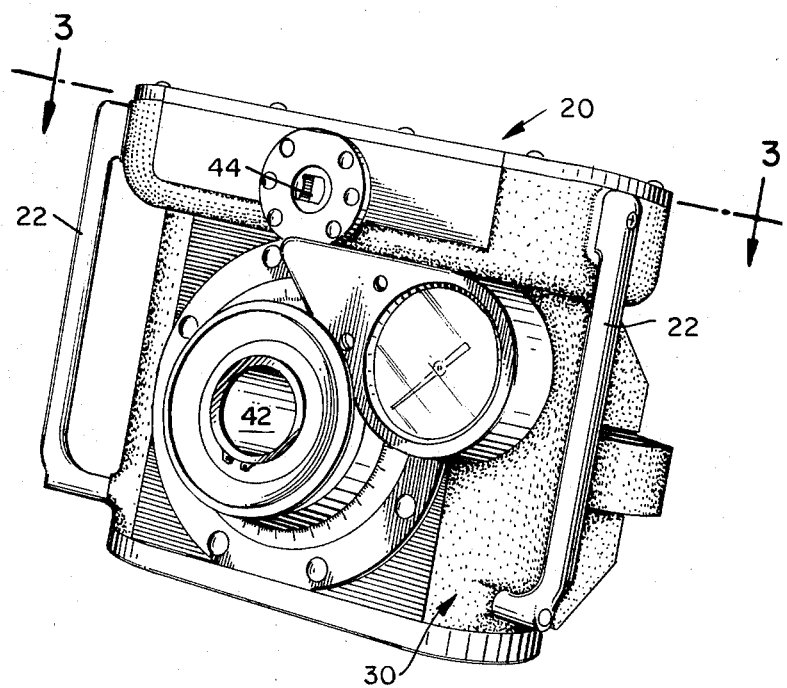
FIG. 1 is a front perspective view of a torque wrench according to this invention.
Figure 2:
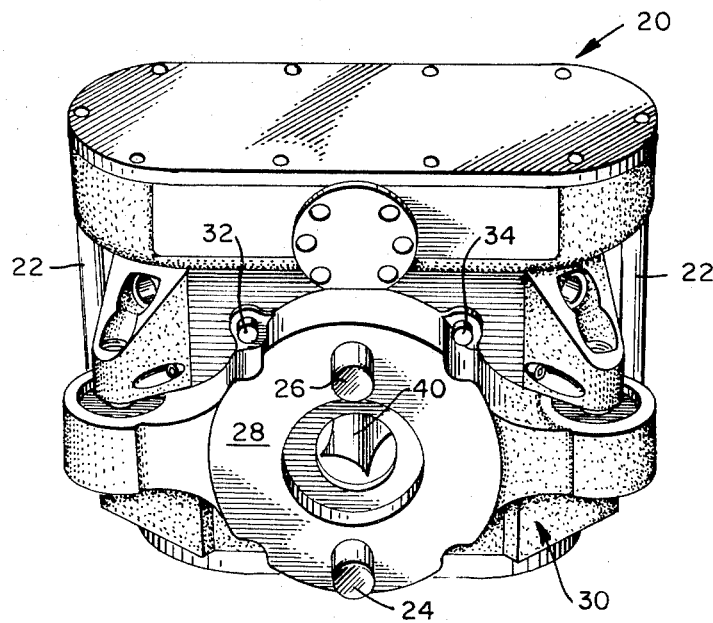
FIG. 2 is a rear perspective view of the torque wrench of FIG. 1.

In FIGS. 1 and 2, torque wrench 20 is shown with the measuring system mounted in place. Wrench 20 is easily handled and mounted in place by using handles 22.

Figure 7:
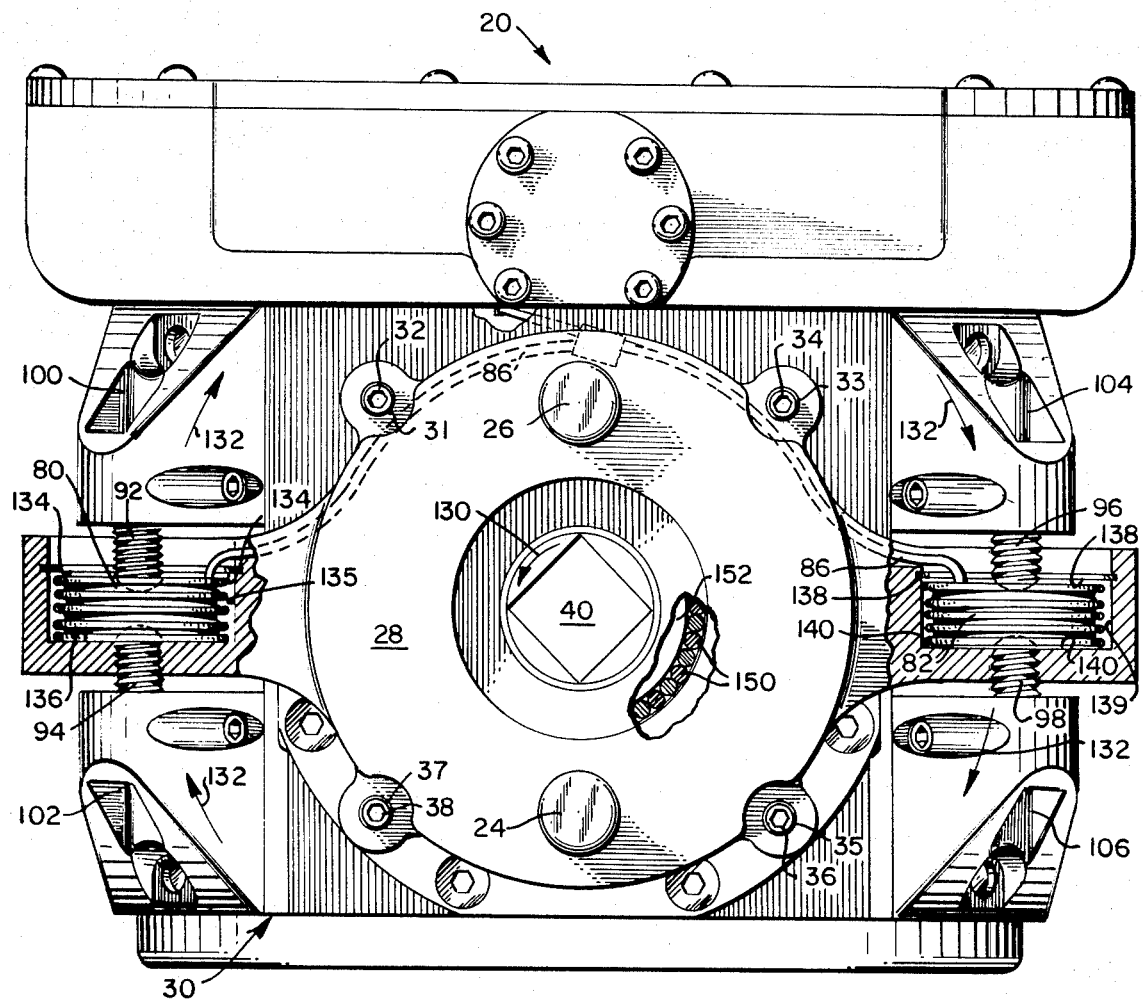
FIG. 7 is a rear view partially broken away and partially in cross section of the torque wrench of FIG. 1.

Mounting pins 24 and 26, which are part of mounting collar 28, are used to secure the wrench 20 in the proper axial orientation for torquing a particular item. Mounting collar 28 is loosely but securely mounted to wrench case 30 of torque wrench 20 by means of bolts 32, 34, 36 and 38. In FIG. 7, it can best be seen that mounting collar 28 contains oversized holes 31, 33, 35 and 37 to allow independent movement between wrench case 30 and mounting collar 28. To this end the bolts 32, 34, 36 and 38 are only finger tightened.

The output torque is provided at the square socket 40, and may be transmitted to the item to be torqued by placing a mating arm into socket 40 provided the mating arm is substantially coaxial with the axis of torque moment desired. The usual method used to transmit the output torque to the item to be torqued is to place a torque transmitting bar, a substantial length of which is shaped so as to mate with socket 40, into hole 42 so that the mating portion protrudes beyond socket 40. The protruding portion of the torque transmitting bar is then engaged with the item to be torqued or adaptors to that item so that the torquing forces can be coaxially transmitted to the item.

Pins 24 and 26 are placed in receiving holes of the item to be torqued or adaptors to that item, and are carefully constructed to be diametrically opposed and equidistant from the axis through which the output torquing force is transmitted.

Pins 24 and 26 are part of mounting collar 28 and assure the stability of mounting collar 28 during the transmission of the output torquing force once pins 24 and 26 are securely positioned in suitable receiving holes.

Once torque wrench case 30 can move independently of mounting collar 28, torque wrench case 30 will be responsive to the reaction torque of the output torque. Consequently, if the output torque is transmitted in a clockwise manner, torque wrench case 30 will experience a reaction torque in the counterclockwise direction.

Figure 3:
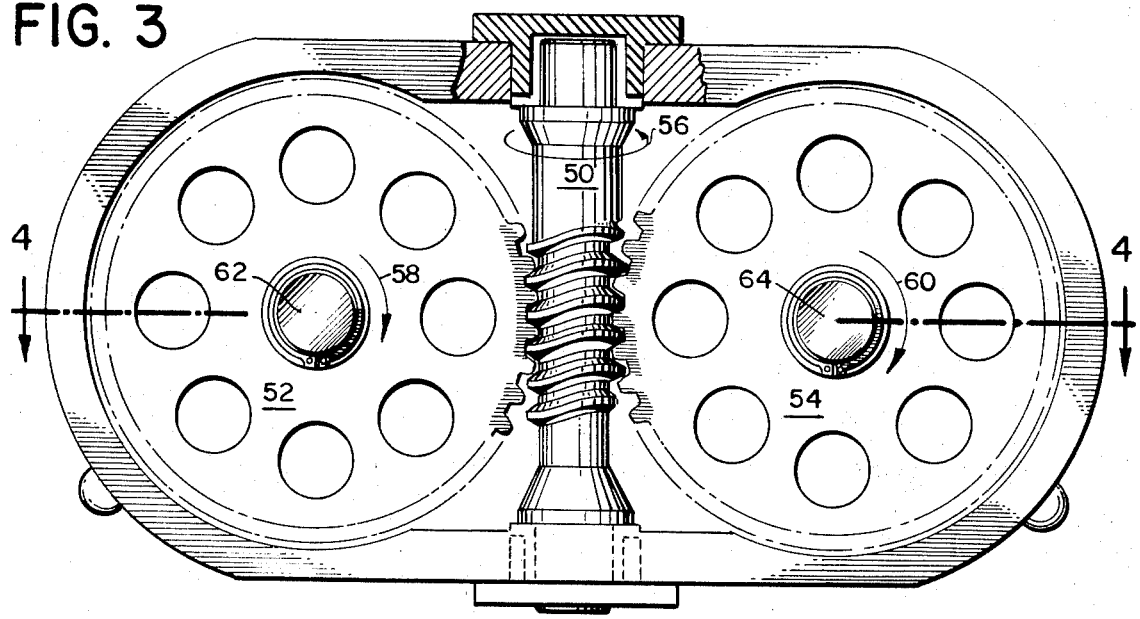
FIG. 3 is a top view, partially in cross-section, taken along the plane 3—3 of FIG. 1.
Figure 4:
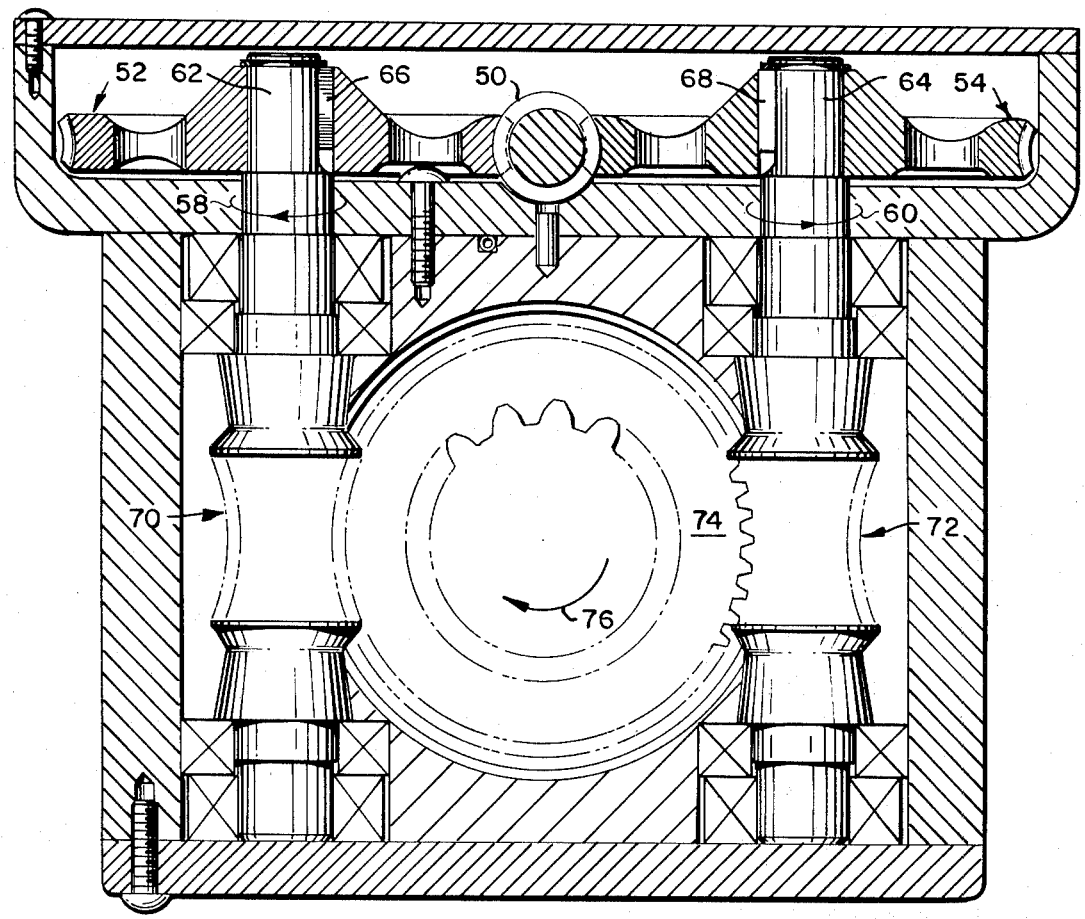
FIG. 4 is a cross section view taken along line 4—4 of FIG. 3.

Referring to FIGS. 3 and 4, the input torque is applied to shaft 50 which is engaged with cogs 52 and 54. When shaft 50 is rotated in the direction shown by arrow 56, cog 52 will rotate in the clockwise direction shown by arrow 58 and cog 54 will rotate counterclockwise as shown by arrow 60.

Shaft 62 is maintained in firm frictional contact with cog 52 by wedge 66, and shaft 64 is similarly maintained in firm driving frictional contact with cog 54 by wedge 68. Shafts 62 and 64 contain hour-glass or double-enveloping worm sections 70 and 72, respectively. The hour-glass worms 70 and 72 are both threaded to firmly engage with the outer splines of bull gear 74 and rotate bull gear 74 in the direction shown by arrow 76. Worms 70 and 72 are hour-glass shaped in order to provide the maximum driving contact between them and bull gear 74.

The torque input supplied at socket 44 (FIG. 1) which rotates shaft 50, is increased 100 times by the system's design before it is transmitted at square socket 40 (FIG. 2) as the output torque. Since gear 74 is in firm driving contact with socket joint 40 (by means not shown), the output torque will have the same rotational direction as gear 74.

Figure 5:
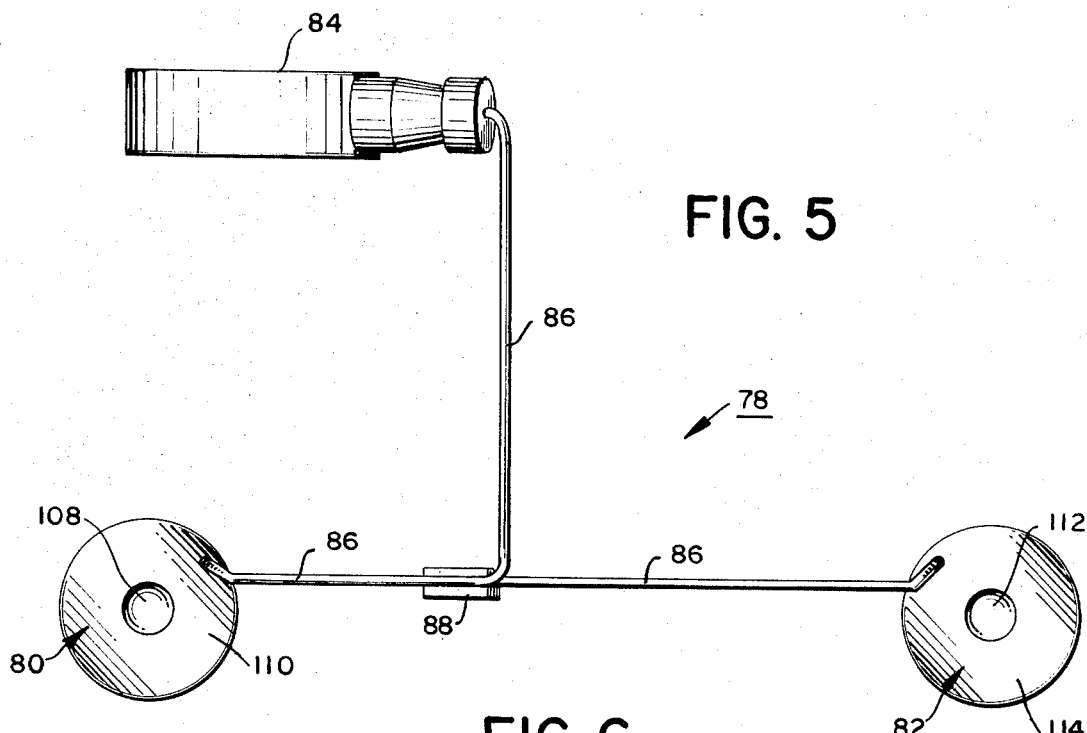
FIG. 5 is a schematic top plan view of the torque measuring system according to this invention incorporated in the torque wrench of FIG. 1.
Figure 6:
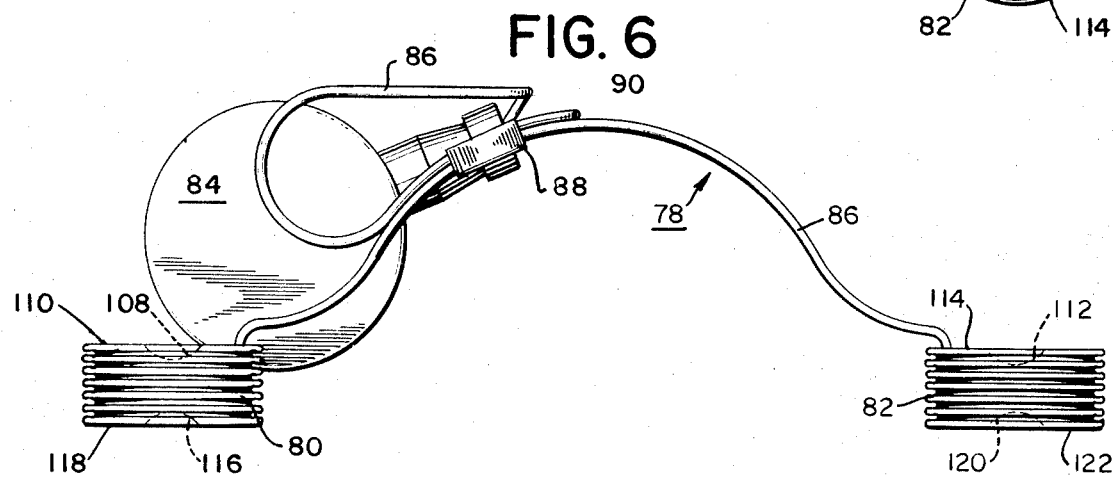
FIG. 6 is a side view of the system of FIG. 5.

In FIGS. 5 and 6 the torque measuring system 78 is shown independent of torque wrench 20. The system comprises bellows 80 and 82, a Bourdon gauge 84, and hydraulic tubing 86. Bellows 80 and 82, and Bourdon gauge 84 are all interconnected by means of tubing 86 at junction block 88.

The inlet 90 provides a charging inlet by which a hydraulic fluid can be supplied to torque measuring system 78. The preferred hydraulic fluid is a glycerin and water combination, with which torque measuring system 78 is filled by means of inlet 90, and then hermetically sealed. This results in a completely independent torque measuring system that is capable of balancing forces throughout the entire system, measuring torque moment arms in either clockwise or counterclockwise direction, and accurately responding to the forces to which it is subjected.

Bellows 80 has a concave depression 108 in top portion 110 of bellows 80. Bellows 82 has a similar concave depression 112 in its top portion 114. Bellows 80 has a similar concave depression 116 in its bottom portion 118, while bellows 82 has a concave depression 120 in its bottom portion 122. Depressions 108 and 116 are positioned so that their center points are coaxial with the axis of bellows 80. Similarly, depressions 112 and 120 have their center points positioned so as to be identical with the axis of bellows 82.

In FIG. 7, torque measuring system 78 is shown mounted in place in torque wrench 20. Bellows 80 is securely mounted in frictional contact with posts 92 and 94, while bellows 82 is similarly mounted between posts 96 and 98. Post 92 is threaded through hole 100; post 94 is threaded through hole 102; post 96 is threaded through hole 104; and post 98 is threaded through hole 106.

Furthermore, bellows 80 is freely positioned between shoulders 134 and 136 which define the annular space 135 in mounting collar 28. To maintain bellows 80 in a free-floating position within annular space 135, bellows 80 is secured to case 30 of torque wrench 20 by simultaneously advancing both posts 92 and 94 toward bellows 80 until posts 92 and 94 are firmly seated at the base of concave depressions 108 and 116, respectively. Similarly, bellows 82 is positioned between shoulders 138 and 140 of annular space 139 in mounting collar 28 and is secured to case 30 of torque wrench 20 so as to be in a free-floating position within annular space 139 by advancing threaded posts 96 and 98 toward bellows 82 until posts 96 and 98 are securely seated at the base of concave depressions 112 and 120, respectively. Annular spaces 135 and 139 are also larger than the diameter of the bellows so that bellows 80 and 82 freely float up to a maximum of .03 inches in all directions.

Bearings 150 are press fitted in mounting collar 28 and placed in frictional contact with the outer diameter of the circular hub 152 of socket 40. The use of bearings 150 provides assurance that the case 30 of torque wrench 20 will be independent of mounting collar 28 and capable of freely floating within its allowable limits.

During use, torque wrench 20 is positioned on an adapter to the item to be torqued by inserting pins 24 and 26 into suitably constructed recesses. The input torque is then applied to socket 44, shown in FIG. 1, and the output torque is transmitted from square socket joint 40.

If the output torque is counterclockwise, as represented by arrow 130, an equal and opposite reaction torque will be transmitted through the gear train assemblies and will attempt to rotate torque wrench case 30 clockwise, as represented by arrows 132. Since mounting collar 28 is mounted on case 30 of torque wrench 20 in a manner that allows independent movement of case 30 and mounting collar 28, the entire torque wrench assembly can be characterized as free floating and independent of the securely fixed mounting collar 28, which is restrained in its position by pins 24 and 26. Because of the assembly's construction as previously described, the free floating independence of case 30 is limited to a maximum of 0.03 inches in all directions.

The reaction of torque, represented by arrows 132, is transmitted to posts 94 and 96, and causes bellows 80 and 82 to be compressed. Since mounting collar 28 is stationary, post 94 forces bottom portion 118 of bellows 80 up so that top portion 110 comes into contact with upper shoulder 134 of mounting collar 28. Similarly, post 96 forces top portion 114 of bellows 82 down so that lower portion 122 will come in contact with lower shoulder 140 of stationary mounting collar 28. As bellows 80 and 82 are simultaneously compressed, the compression force is transmitted through hydraulic tubing 86 by means of the hydraulic fluid and will cause the Bourdon tube within the gauge to be deflected in a manner so as to indicate on the face of the Bourdon gauge the measurement of this reaction torque which is equal to the output torque. Since the torque wrench unit is essentially free-floating and independent of mounting collar 28 and each bellows can be compressed by either of its securing posts, the torque wrench can be used to measure torques that are applied in either the clockwise or the counterclockwise direction.

If torque wrench 20 is properly positioned, the output torquing force, supplied at socket 40, will be transmitted coaxially to the item to be torqued. If this condition is satisfied, both bellows 80 and 82 will be compressed with equal force and this balanced force will be measured by the Bourdon gauge.

The existing hydraulic systems are capable of measuring torquing forces when applied coaxially with the item to be torqued, but such measurement has not been accomplished on mechanical systems. Furthermore, prior systems cannot properly measure a transmitted torquing force which was not perfectly coaxial with the item to be torqued.

One of the major advantages of the torque wrench, according to this invention, is its ability to automatically compensate for offset and misalignment which causes the torque to be transmitted on an axis which is eccentric with the axis of the item to be torqued. This wrench is capable of accomplishing this automatic compensation because of the free-floating independency of the torque wrench case unit with respect to mounting collar 28. When the output torque is transmitted along an axis that is eccentric with the axis of the item to be torqued, the interconnected bellows will maintain balanced equal forces thereat. The free-floating torque wrench case 30 will thus oscillate in an epicycloidal manner as socket 40 rotates. This type of oscillation prevents any unbalanced forces from being transmitted that will cause binding or seizing of the item to be torqued during the torquing process, and assures that only the actual torque is accurately measured by the gauge.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A torque wrench comprising:
   A. a mounting member;
   B. a torque multiplying member attached to said mounting member with a circumferential degree of freedom allowing radial movement transverse to the axis about which the torque is applied, thereby being freely floating with respect to said mounting member;

C. means for applying a torque between said mounting member and said torque multiplying member; and D. force sensing means functionally mounted between said mounting member and said torque multiplying member, a force of said torque being applied to said sensing means.

2. A torque wrench as defined in claim 1, wherein said force sensing means comprises two force transducers mounted on diametrically opposite sides and equidistant from the axis about which said torque is transmitted between said members, said force sensing means thereby being sensitive to pure torque.

3. A torque wrench as defined in claim 2, wherein said two transducers are force to pressure transducers and said force sensing means further comprises a single pressure indicating device interconnected with the said two force transducers by a common pressure transmitting medium.

4. A torque wrench comprising:
A. a torque indicating assembly comprising:
   a. two or more fluid load cells mounted on opposite sides of the torque axis, and
   b. a single pressure sensing device, all interconnected by a hermetically sealed common pressure transmitting medium;
B. a torque wrench case comprising:
   a. supporting means in holding contact with said load-cells,
   b. torque multiplying means for producing an output torque which is substantially greater than an input initiating torque, and
   c. output means for transmitting said output torque; and
C. a mounting member attached to said torque wrench case and comprising:
   a. means for containing said load cells, and
   b. locator means for proper positioning of said mounting member.

5. A torque wrench as defined in claim 4, wherein said supporting means comprise securing posts positioned symmetrically about and equidistant from the axis through which the torque is transmitted, which hold each load cell at the uppermost and lowermost point of the load cell's central axis.

6. A torque wrench as defined in claim 5, wherein said load cells comprise bellows having locator depressions at the uppermost and lowermost point of their central axes to assure proper positioning of the bellows by the securing posts.

7. A torque wrench as defined in claim 4, wherein said containing means comprise substantially annular spaces which are symmetrical about and equidistant from the axis through which the torque is transmitted.

8. A torque wrench as defined in claim 4, wherein said locator means comprise pins for placement in properly positioned receiving holes of an adaptor.

9. A torque wrench as defined in claim 4, wherein said substantially annular spaces comprise a diameter greater than the outer diameter of said load cells.

10. A torque wrench as defined in claim 9, wherein said substantially annular spaces comprise an overall height that is greater than the height of said load cells.

11. A torque wrench comprising:
A. a mounting member;
B. a torque multiplying member slidably interconnected with said mounting member to allow planar epicycloidal oscillation of the torque multiplying member with respect to the mounting member;
C. means for applying a torque between said mounting member and said torque multiplying member; and
D. force sensing means functionally mounted between said mounting member and said torque multiplying member, a force of said torque being applied to said sensing means.

* * * * *